Dec. 19, 1944.                V. R. ABRAMS                2,365,162
                         LAMINATED FINNED CYLINDER
                           Filed Feb. 23, 1943

Inventor
Victor R. Abrams
By C.E. Herrstrom & H.E. Thibodeau
Attorneys

Patented Dec. 19, 1944

2,365,162

UNITED STATES PATENT OFFICE 2,365,162

LAMINATED FINNED CYLINDER

Victor R. Abrams, Detroit, Mich.

Application February 23, 1943, Serial No. 476,876

7 Claims. (Cl. 257—261)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel power cylinder with means for rapidly cooling it in air. Such a cylinder is especially desirable where ordinary air cooling is insufficient, or where liquid cooling is not feasible, as in a combat tank. In the more specific embodiments the invention contemplates a power chamber such as the cylinder of an internal combustion engine, of a compressor or of a Roots blower. Another application of the invention is a conduit for the flow of fluid such as a refrigerant.

The structure consists of a nested arrangement of tapered or conical members, each having an outwardly extending radiating fin. The inner edges or smaller ends of the tapered members form a jagged wall. When the structure is to be used as a power cylinder, the wall is machined to a smooth finish. The angle of taper is such that the wall of the structure in any transverse plane consists of several thicknesses of nested members after machining. The chamber may be a simple cylinder or a pair of joined cylinders as in a Roots blower. A multiple of cylinders may be provided in a single structure, in which case each of the nested members is formed with a corresponding number of tapered portions.

In a further embodiment of the invention the tapered portions are corrugated lengthwise, and successive members are fitted into one another at the corrugations. Several advantages result from such an arrangement. The corrugations provide increased bonding area between successive members, increased radiation area, and increased structural strength. Further, the outwarding extending fins may be corrugated radially or circumferentially for increased radiation area and resistance to flexing.

The invention is fully disclosed by way of example in the following description and in the accompanying drawing in which Figure 1 is an elevation of a structure according to the invention;

Reference to these views will now be made by use of like characters which are employed to designate corresponding parts throughout.

Figure 2:
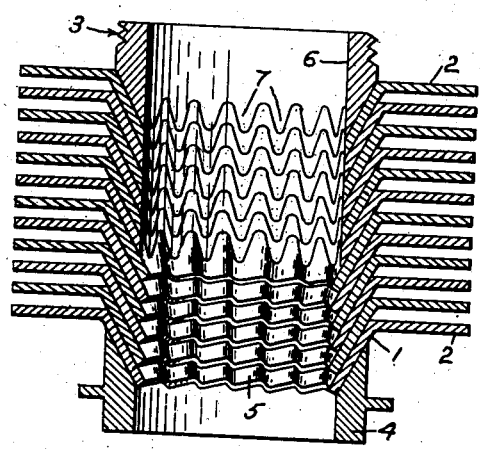
Figure 2 is a vertical section thereof, showing the device partially machined.

Each of the elements from which the structure is built up includes a tapered portion 1 having an outwardly extending flange or fin 2 preferably at the larger end. In this form the element can be made by a stamping operation. Although shown essentially in conical form, the tapered portion may consist of two conjoined cones, or may be of any other shape suitable for the purpose under consideration. The elements are nested by inserting the tapered portions one within the other, as illustrated in the lower portion of Figure 2. The angle of the taper is large enough so that in any given transverse plane the wall thickness is built up of several thicknesses of material. Suitable fittings 3 and 4 are mounted at the ends of the series to complete the assembly. The smaller ends of the portion 1 form a jagged surface 5 as illustrated in Figure 2.

Obviously such a surface is not suitable for a power chamber and is therefore machined and finished to a smooth wall 6. The exposed edges of the portions appear as wavy lines 7 due to the corrugations.

In assembling the elements, prior to machining, the portions 1 should be secured together and a brazing operation is suitable for this purpose, as shown in U. S. Patent 2,206,286 of July 2, 1940, in which the brazing material is melted within the chamber and permitted to flow between the nested members. Another method is to provide the brazing material in the form of sheets between the nested members and then melt the material in a hydrogen atmosphere. The material then appears as a small thickness or film at the lines 7 in the machined wall 6.

Figure 1:
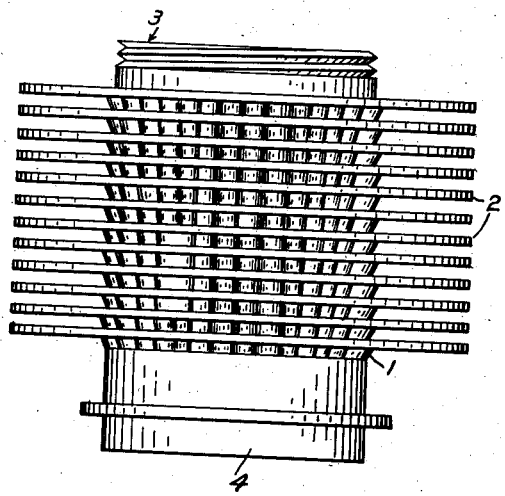
Figure 3:
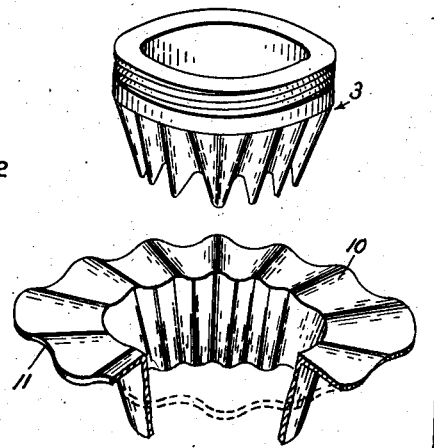
Figure 3 is a detail perspective view, partly broken away, of a modified construction.

In the modification shown on Figure 3, the fin 10 may be corrugated radially at 11 in continuation of the corrugations in the portion 1, or circumferentially if desired. Such corrugations increase the radiation surface of the fin and provide greater stiffness.

Figure 4:
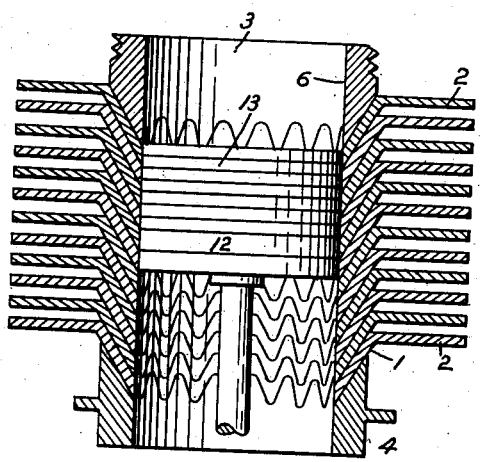
Figure 4 is a vertical section of the machined chamber with a piston therein.

In an apparatus where the cylinder contains a piston 12, as in Figure 4, the piston rings 13 are of greater height than the minimum distance axially of the cylinder, between any two points of two adjacent lines, with the result that the likelihood of the ring snagging in a joint is substantially eliminated.

An important property of the exposed joints in the inner cylinder wall is that the lubricating and wearing qualities of this wall are improved by the incorporation of the brazing material therein. In this connection, the brazing material consists chiefly of copper and may contain a quantity of an alloying metal such as beryllium. The melting point of the material should obviously be sufficiently high to withstand the temperature developed within the cylinder.

Elements of the general character described may be assembled into a block having a plurality of cylinders. In such case each cylinder is formed with a corresponding number of tapered portions having a common or continuous radiation fin. Also, the tapered portions may be in the form of two communicating chambers suitable for use in a gear pump or a Roots blower. The superimposed fins in an assembly may be penetrated by a suitable number of tubes for circulation of air, water or any desired cooling agent.

In a circulating system for refrigerant or the like, the smooth machined inner wall has the further advantage of reducing the resistance to flow.

Although specific embodiments of the invention have been illustrated and described, it will be understood that various alterations in the details on construction may be made without departing from the scope of the invention as indicated by the appended claims.

What I claim is:

1. A cylinder comprising a series of nested and mutually secured elements each including a tapered portion and a fin extending outwardly therefrom, the nested tapered portions forming a smooth bore, the angle of said portions being such that several thicknesses thereof occur in any transverse plane of the nested assembly.

2. A cylinder comprising a series of nested and mutually secured elements each including a tapered portion and a fin extending outwardly therefrom, the nested tapered portions forming a smooth bore, said portions being corrugated lengthwise, the corrugations of each portion fitting into those of the adjacent portions.

3. A cylinder comprising a series of nested and mutually secured elements each including a tapered portion and a fin extending outwardly therefrom, the nested tapered portions forming a smooth bore, said portions being corrugated lengthwise, the corrugations of each portion fitting into those of the adjacent portions, the angle of said portions being such that several thicknesses thereof occur in any transverse plane of the nested assembly.

4. A cylinder comprising a series of nested elements each including a tapered portion and a corrugated fin extending outwardly therefrom, the nested tapered portions forming a smooth bore, said portions being corrugated lengthwise, the corrugations of each portion fitting into those of the adjacent portions, and means for securing said portions together.

5. A cylinder comprising a series of nested elements each including a tapered portion and a fin extending outwardly therefrom, the nested tapered portions forming a smooth bore, said portions being corrugated lengthwise, the corrugations of each portion fitting into those of the adjacent portions, and bonding material between the nested portions and substantially coextensive therewith, said material being a relatively good conductor of heat.

6. A cylinder comprising a series of nested and mutually secured elements each including a tapered portion and a fin extending outwardly therefrom, the nested tapered portions forming a smooth bore, said portions being corrugated lengthwise, the corrugations of each portion fitting into those of the adjacent portions, and a bonding material securing said portions together and appearing in wavy lines at said bore.

7. A cylinder comprising a series of nested and mutually secured elements each including a tapered portion and a fin extending outwardly therefrom, the inner edges of said portions being finished to form a smooth surface, said portions being corrugated lengthwise, the corrugations of each portion fitting into those of the adjacent portions, and a bonding material securing said portions together and appearing in wavy lines at said finished surface, a piston positioned to operate along said surface, a piston ring carried by said piston, the height of said ring being sufficient to engage two adjacent wavy lines simultaneously.

VICTOR R. ABRAMS.